United States Patent
Frasure et al.

(10) Patent No.: US 6,688,320 B2
(45) Date of Patent: Feb. 10, 2004

(54) UTILITY CONSERVATION CONTROL METHODOLOGY WITHIN A FLUID PUMPING SYSTEM

(75) Inventors: Steve Frasure, Londonderry, NH (US); Carl McBride, Garland, TX (US); John Tucker, Grape Vine, TX (US)

(73) Assignee: Flowtronex PSI, Inc., Dallas, TX (US)

(*) Notice: Subject to any disclaimer, the term of this patent is extended or adjusted under 35 U.S.C. 154(b) by 69 days.

(21) Appl. No.: 10/010,639

(22) Filed: Nov. 13, 2001

(65) Prior Publication Data

US 2002/0096219 A1 Jul. 25, 2002

Related U.S. Application Data

(60) Provisional application No. 60/246,986, filed on Nov. 10, 2000.

(51) Int. Cl.$^7$ .............................. G05D 7/06; E04B 49/06
(52) U.S. Cl. .................... 137/12; 137/565.13; 417/44.2
(58) Field of Search ................... 417/44.2; 137/565.13, 137/12

(56) References Cited

U.S. PATENT DOCUMENTS

| | | | |
|---|---|---|---|
| 5,221,189 A | * 6/1993 | Henningsen | 417/12 |
| 5,339,854 A | 8/1994 | Leith | 137/2 |
| 5,460,196 A | 10/1995 | Yonnet | 137/12 |
| 5,464,327 A | 11/1995 | Horwitz | 417/12 |
| 5,522,707 A | 6/1996 | Potter | 417/4 |
| 5,580,221 A | 12/1996 | Triezenberg | 417/44.2 |
| 5,878,953 A | 3/1999 | Coffman | 239/1 |
| 5,941,690 A | * 8/1999 | Lin | 417/44.2 |

* cited by examiner

*Primary Examiner*—A. Michael Chambers
(74) *Attorney, Agent, or Firm*—Ware, Fressola, Van Der Sluys & Adolphson LLP

(57) ABSTRACT

The present invention relates to a process of utility conservation control methodology within a fluid pumping distribution system. With fluid flowing through a distribution grid, the pressure at any given point becomes a function of system flow. At a specific flow rate, the pressure at this point is a function of flow rate. This invention is a process that continuously adjusts the pressure requirement for the pumping system by varying the pump speed according to the system head curve details. This invention produces several benefits for a fluid distribution system including reducing utility costs and equipment aging.

10 Claims, 5 Drawing Sheets

FLUID DISTRIBUTION SYSTEM

UTILITY CONSERVATION CONTROL METHODOLOGY WITHIN A FLUID PUMPING SYSTEM

This application claims the benefit of U.S. Provisional Application No. 60/246,986, filed Nov. 10, 2000, which is incorporated herein by reference.

BACKGROUND AND SUMMARY OF THE INVENTION

The present invention relates generally to a process for adjusting the supply pressure within a fluid pumping system, for example, fluid flowing through a complex distribution grid, by varying the speed of the pump supplying the fluid to the system. By adjusting the pressure generated by the pump in response to fluctuating demand rather than maintaining a constant pump pressure, utility costs can be reduced and equipment life may be increased.

Output demand within a given fluid distribution system may vary at any given time due to numerous factors. In public water distribution systems, for example, these factors may include the time of day, the day of the week, and weather conditions. Pump output within the fluid distribution system must generally be sufficient to maintain a predetermined pressure. However, as water usage increases, the pressure in the fluid distribution grid generally decreases; conversely, as the water usage decreases, the pressure in the distribution grid generally increases.

Because it is generally desirous to maintain some predetermined pressure within the fluid distribution system, pump output is typically set to maintain this predetermined pressure at maximum demand. Thus, there is typically a constant state of high pressure in these fluid distribution systems, especially during off-peak hours. Maintaining this high-pressure state requires a considerable expenditure of energy as well as contributing to fluid leakage and wear in the distribution grid.

Conventional control systems that attempt to maintain a constant output pressure at their discharge often fail to maintain the same pressure inside a typically complex piping grid, largely due to nonlinear losses caused mostly by friction. Most older, conventional control systems often employ only control valves, or alternatively, may simply repeatedly start and stop the supply pump to adjust pressure. Control valves are relatively ineffective to control pressure in a large distribution system, and frequent starting and stopping subjects a pump's motor to a high-in rush current and can cause water hammer problems. Such results may lead to higher energy costs and reduced equipment life.

More modern systems may make use of variable frequency drives (VFD's) to adjust pressure by varying pump output (speed). In order to compensate for pressure fluctuations within the fluid distribution system, these VFD control systems may employ pressure sensors to send signals to a programmable logic controller (PLC), which may then vary the pump speed in response thereto. However, even with known VFD control systems, generally only a small number of fixed set points are used to vary pump output, such as, for example, a set point for each of day time and night time operation. Therefore, what is needed, but has been heretofore unavailable, is a control system that utilizes multiple set points to continuously vary the target pressure in response to changing demands on the system.

The system and method of the present invention satisfies this need. The present invention discloses an interactive process that monitors and continuously adjusts the fluid pressure within a fluid distribution system so that adequate distributed pressure is maintained throughout. The present system generates and uses derived functions that are components of the process, to alter a reference set point and create a new, effective set point. The speed of the pump motor can then be continuously adjusted to maintain the system at a pressure closer to the effective set point. The creation of a continually variable effective set point as contemplated by the present invention allows for more accurate system pressures, and also permits reduced pump output during periods of low inflow. Therefore, the present invention allows for reduced stress on the fluid distribution system components, which in turn may reduce energy costs, fluid leakage, and equipment aging.

In addition to the novel features and advantages mentioned above, other objects and advantages of the present invention will be readily apparent from the following descriptions of the drawings and exemplary embodiments.

DETAILED DESCRIPTION OF THE EXEMPLARY EMBODIMENT(S)

Figure 1:
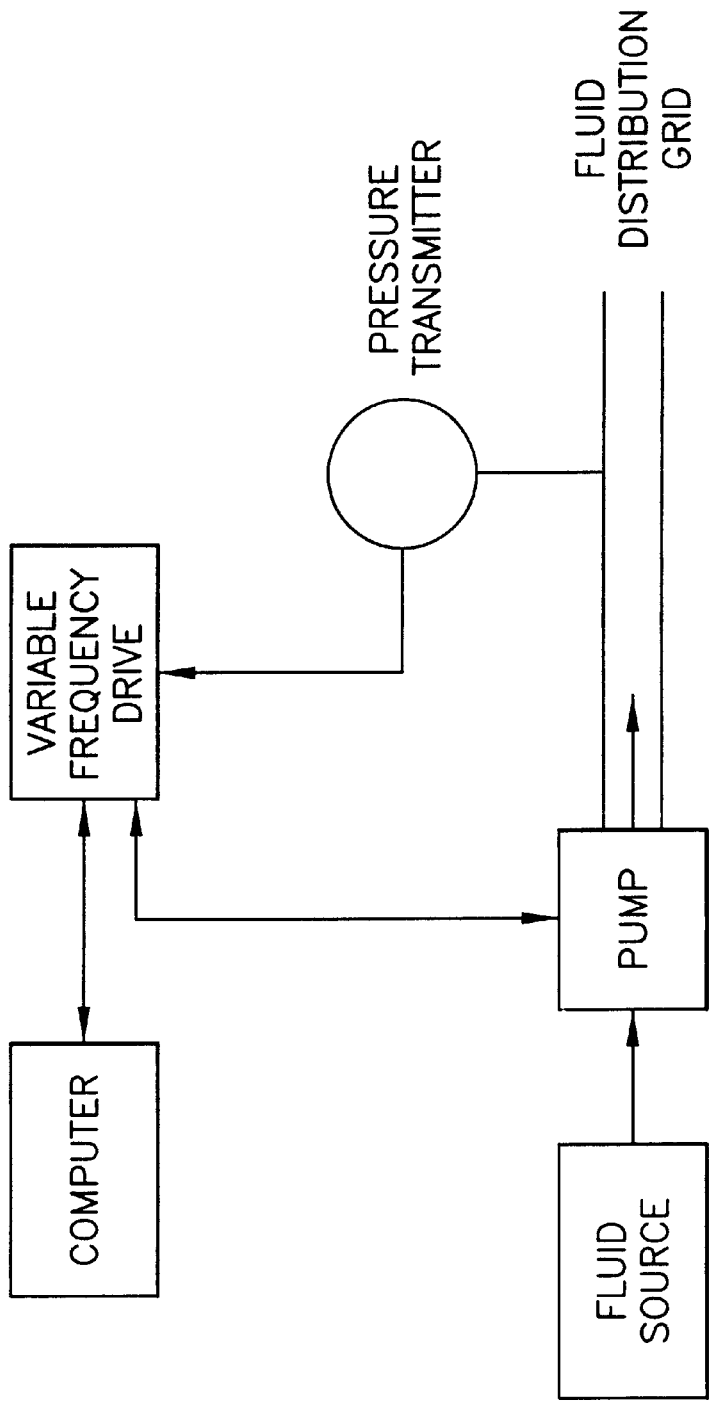
FIG. 1 is a diagram of a fluid distribution system in one embodiment of the present invention.

The present invention contemplates a process for controlling pressure in a fluid distribution system, such as, for example, a public water supply system. An example of such a system is illustrated in FIG. 1. A typical fluid distribution system may generally be comprised of a piping grid through which fluid is supplied by one or more hydraulic pumps.

Known systems have used or suggested the use of control valves or the intermittent starting and stopping of the hydraulic pump or pumps to control system pressure. Others have suggested coupling a variable frequency drive (VFD) motor to the pumps, with the VFD responding to 1 or 2 set points in order to control pressure. However, each of these known methods presents drawbacks, including lack of adequate pressure control, water hammering, large motor stresses, large piping stresses, and the inability to consider a sufficient number of pressure variations at different locations within the piping grid. These known systems also lack the ability to respond to pressure fluctuations within the distribution system on a continual basis, but rather adjust pressure only periodically in response to a limited number of set points.

In contrast to these known systems and methods, the present invention utilizes a family of set points in order to account for the pressure variations that may occur at different locations within the distribution system. Such pressure variations may occur due to, for example, system design, non-linear friction losses within the piping grid, and fluctuating demand. The system and process of the present invention continuously vary pump speed in response to a family of set points, in order to more accurately maintain pressure throughout the distribution system at a desired level. The present invention attempts to maintain system pressure at levels that are adequate to maintain proper flow, but to reduce or eliminate over-pressurization that may occur during periods of decreased demand or because of the use of inadequate control systems. The present invention determines an effective set point that may differ from a reference set point based upon demand on the system. The effective set point may be calculated using pressure information received from multiple pressure transducers monitoring pressure fluctuations within the distribution system. The speed of the pump motor may then be continuously adjusted by a programmable logic controller (PLC) to generate a pump output that will produce a pressure as close as possible to the effective set point—even as the effective set point varies.

Figure 3:
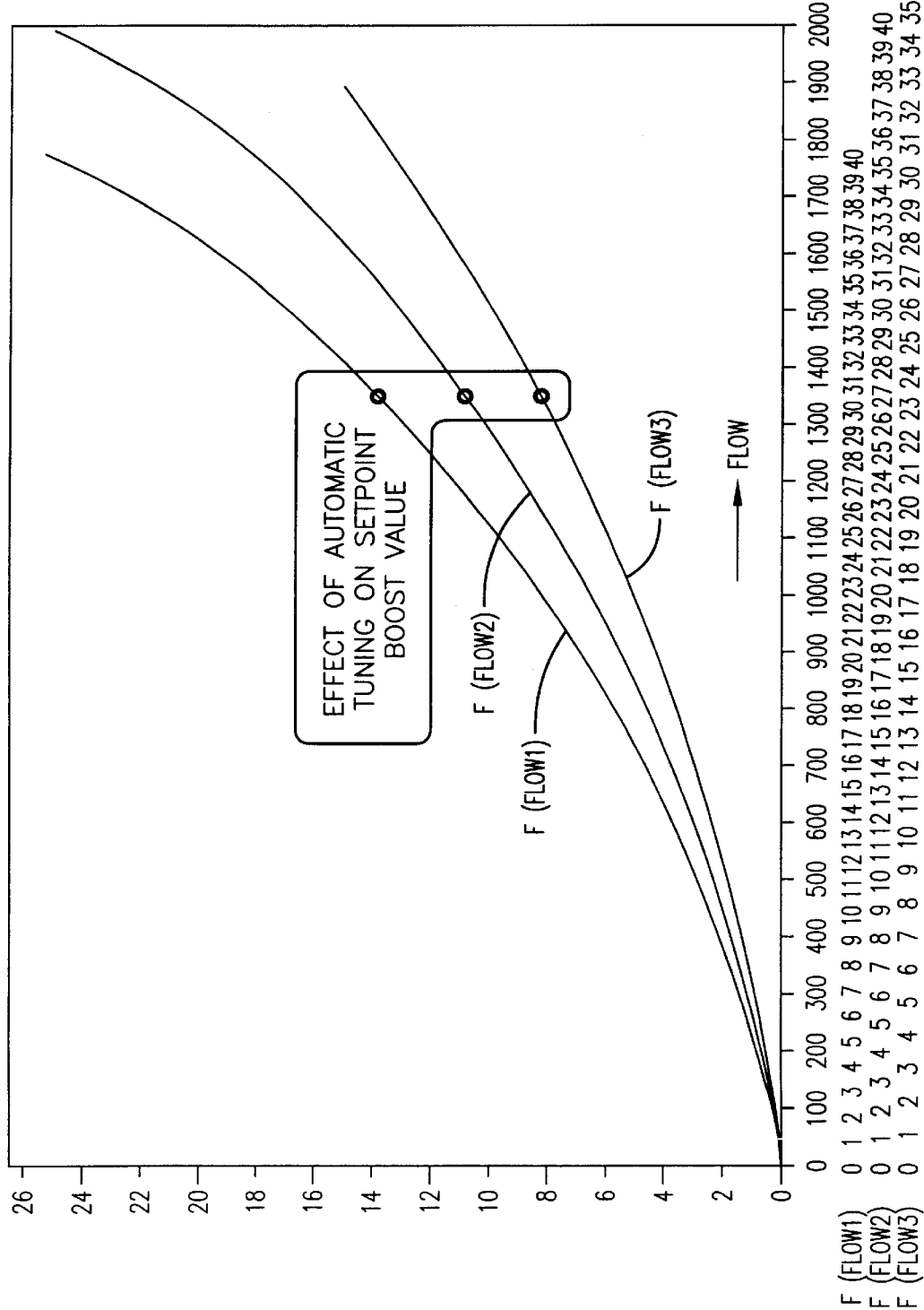
FIG. 3 is a graph depicting automatic tuning in an exemplary embodiment of the present invention.
Figure 4:
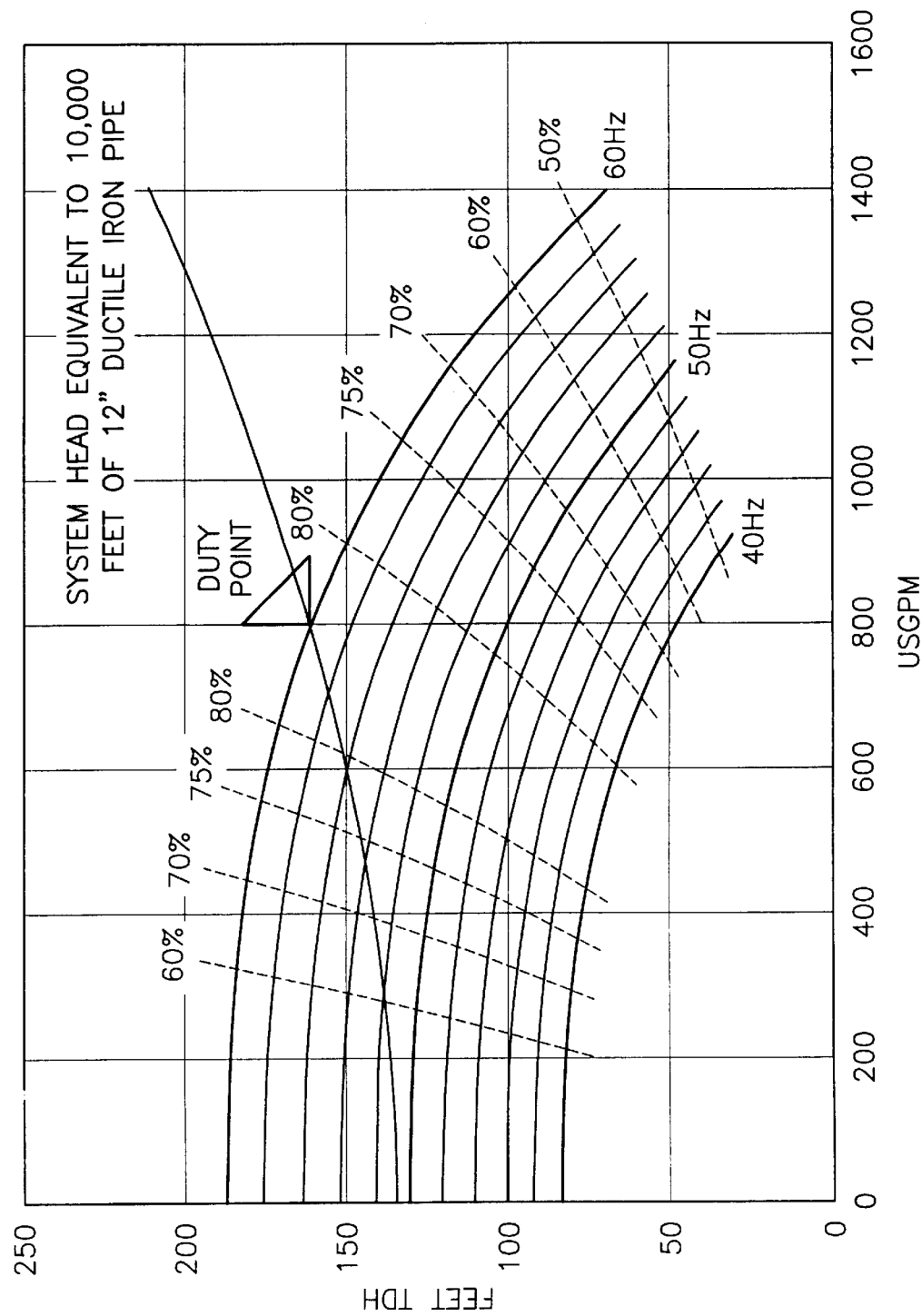
FIG. 4 is a graph depicting a system head curve within an algorithm of an exemplary embodiment of the present invention.
Figure 5:
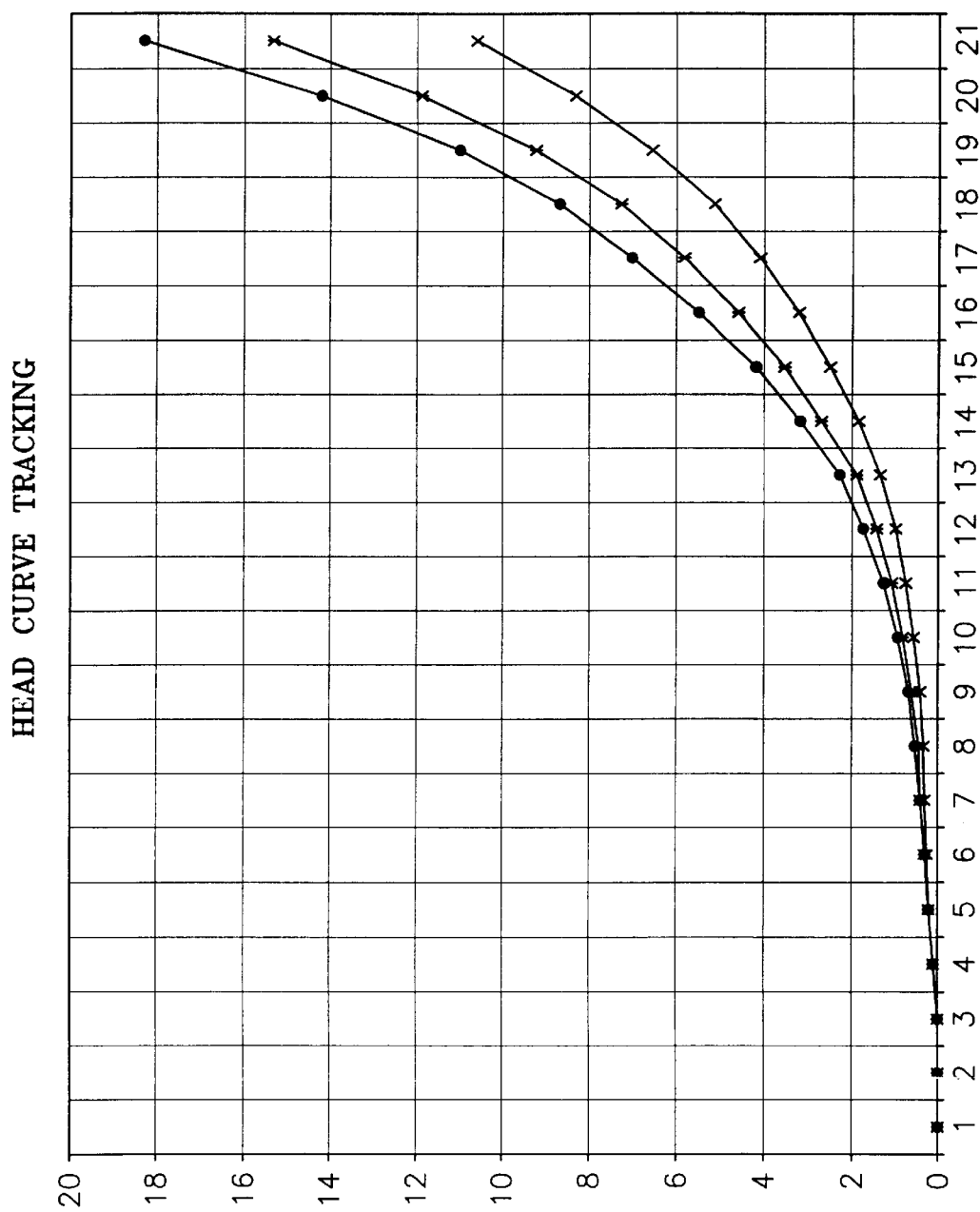
FIG. 5 is a graph depicting head curve tracking of an exemplary embodiment of the present invention.

At a specific flow rate of fluid through a distribution system, the pressure at any given point is a function of flow rate. As such, the present invention employs derived basic functions to continuously adjust the pressure within a fluid distribution system. The basic functions are components of the process that may be discrete, piecewise approximations, or may be explicit depending on the mathematical capabilities of the control system in use. A basic function is shown below as an exponential type function.

$$f(z(x))+\text{reference set point}=\text{effective set point}$$

where $z(x)=$ a derived or measured relationship between flow and required input pressure The basic function is turned into an interactive family of functions by this invention using an intermediate flow response parameter. The flow response parameter is a non-dimensional value that is proportional but not equal to the flow of the fluid itself. The flow response parameter can be altered either manually or by the control processor as changes in the configuration of the grid system occur. This also allows for interactive tuning of function scale mismatch that occurs when correctly shaped response functions do not match real world results as demonstrated in FIG. 3. Summing the interactive family of functions produces the effective set point, which is a combination of a zero flow static reference and a non-linear boost function.

Figure 2:
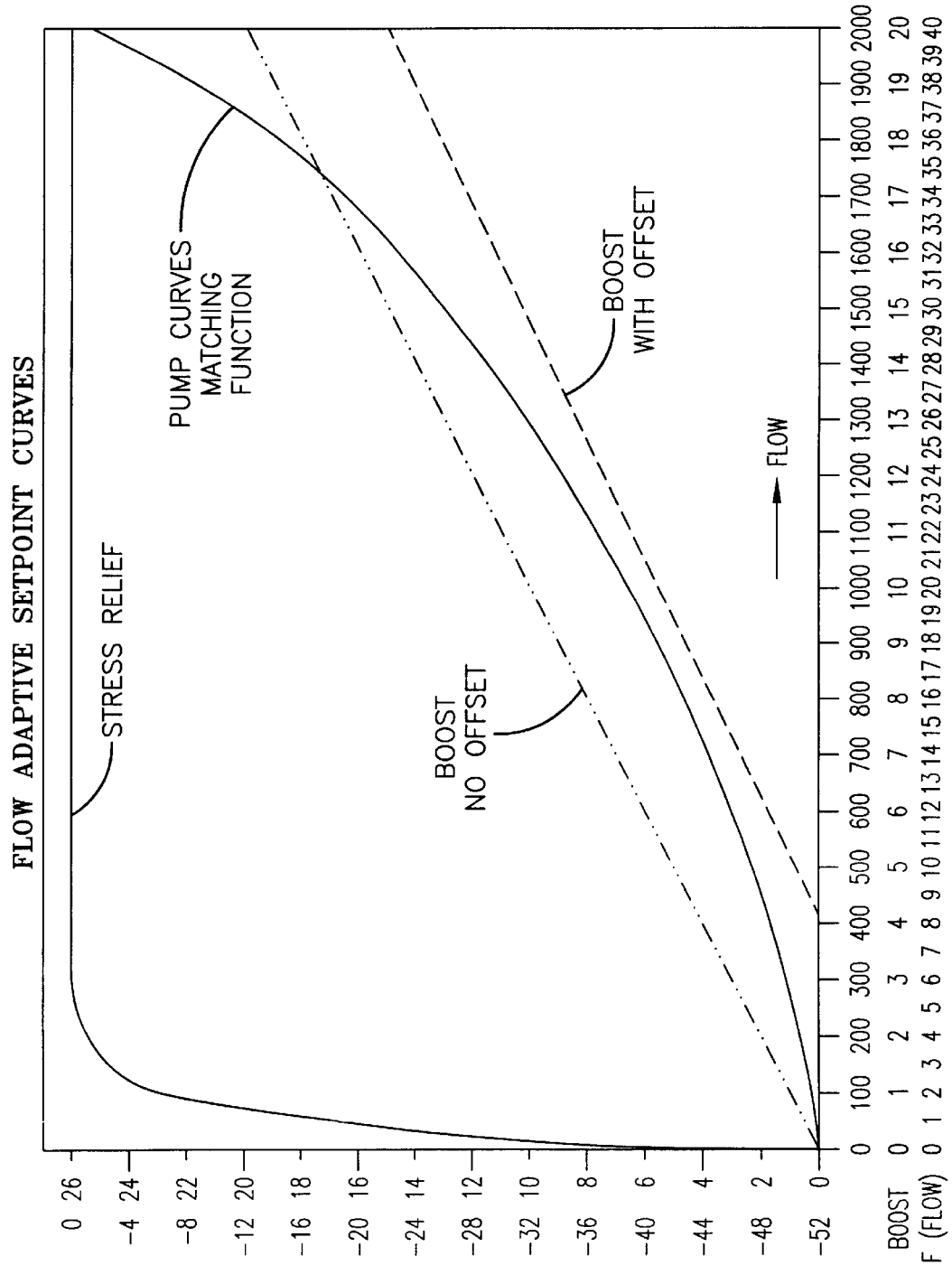
FIG. 2 is a graph depicting flow adaptive set point curves in an exemplary embodiment of the present invention.

As an example, the present invention can be implemented in a typical municipal water supply system. The pump discharge pressure required to maintain desired pressures at strategic points located throughout the distribution system is quantified as a system head curve. This can be done by manually collecting and plotting pressure data at several different flow rates as shown in FIG. 2. This data can also be generated by any program that predicts system head curves based on the configuration of the water distribution system. Often times, this data will already exist for the particular water distribution system involved.

As demonstrated in FIG. 2, the system head curve is converted to a set point boost curve. The set point boost curve is a correction, which will allow the water distribution system to substantially maintain desired pressures at different points throughout the piping grid and over the system's entire flow range. The correction data should preferably range from approximately no flow to approximately 110% of the full design flow output. As shown in FIG. 2, the X-axis for the set point boost curve represents flow, while the Y-axis indicates the amount of correction or boost required, in the appropriate calibrated pressure units. The curve may be used as a lookup table.

Simulated flow generated by the process of the present invention is then used to calibrate a flow response analog channel. As flow increases the amount of data in the analog channel, a small number, generally between about 0 to about 40, is produced and is substantially proportional to the flow over about 110% of the expected flow range. A plot of the analog channel data is generated to obtain necessary correction or boost values. This correction data is entered into a discrete function buffer or any other suitable device. Zero flow pressure is preferably entered as a reference set point to which the boost pressure is added to maintain pressure throughout the distribution grid near to zero flow pressure. Using simulated flow, the general performance of the system may be tested.

This process can be refined for greater accuracy using real flow data. During real flow conditions, the control program in use is preferably placed into an automatic adjustment mode. This mode may cause the flow response channel to scale its output by either expanding or compressing for improved correlation of lookup table data with flow. With the controller in automatic adjustment mode, the process of the present invention may search through a family of stored flow response curves until the best match is found for the current conditions. Once a match is found, a new curve scalar is calculated such that the curve will match at the flow point where the adjustment is to be made. In some embodiments, the automatic adjust mode should preferably only be employed during periods of high flow, however, due to errors that may be caused by shallow curve slopes in low flow regions.

This invention can serve as a basis for many auto-response systems. For example, this invention can be made responsive to booster pump pressure at the inlet of a fluid distribution grid. The discrete function generated by this invention may produce negative boost values when the inlet grid pressure drops below some predetermined threshold value. The effective set point, as determined by the present invention, would then be the sum of the negative boost and the normal set point. For example, assuming the discrete function is linear with a slope of 1, the normal set point is 100 PSI, the threshold value is 25 PSI, and the inlet pressure drops to 15 PSI, the effective set point would be 90 PSI. If multiple pressures are measured throughout the distribution grid, this multi-variable data can be reduced to a single value, either by a statistical process or mere sorting.

Also, this auto-response methodology provides an easy way for supervisory control and data acquisition (SCADA) systems to provide low impact intervention on nearly independent nodes in a distributed control strategy. Under this scheme, a remote pressure or flow request could be input from a supervisory system. This form of supervision will alter node contribution to the overall system to allow slave systems to exercise their control functions for maximum system benefit and allow the supervisor complete control of all nodes.

The family of curves is the natural result of the process of the present invention. The system head curve function is assumed to have the correct shape, however derived, which will be very close to an actual measured system curve; but practical issues will often cause a magnitude error which is of much greater magnitude than the shape error. This magnitude error can be easily dealt with by interposing a linear function referred to as a flow response curve. This linear function is substituted for the flow rate variable in the system head curve. Because a linear function has only two constants, the magnitude error of the system head curve can be readily corrected. The reason for this is further clarified below:

Where: $H=f(X)$

H is the system head curve. The head curve function may be nonlinear. Let the flow (Variable X) be replaced by a linear function.

$$flow=s(X)+b$$

linear flow response function s=slope b=offset

H=f(flow) is a now a family of curves as alteration to s or b produce magnitude changes but not a shape change. The effects of altering s and b on the system head curve are shown. If the "b" in the flow response curve is varied the curve will move up and down on the "Y" axis. If the "s" parameter is varied the curve will vary in magnitude. It will appear to expand or shrink but does not change its general shape.

For example, if an offset "b" is added to the flow response function, the curve will be moved up or down the Y axis. If the offset is such that the zero flow point of the curve is the reference setpoint, then the head curve function can be transformed to a more useful setpoint boost function. This manipulation is shown below.

$$H=f(s(X)+b)$$

$$H'=f(s(X)+b)+\text{Setpoint}$$

$$\text{Boost}=H'? \text{ Setpoint}$$

$$\text{Boost}=F(s(X)+b)$$

Where boost is the amount that the setpoint must be altered at any flow to produce remote pressure required by the user. The b is fine tune offset, and s is the curve magnitude adjustment parameter.

It is well documented by field experience that the shape of system head curves are far more likely to be correct than the absolute magnitude of these curves. This process allows adjustment by picking the correct member of the family of curves to match the real measured curve.

The flow response function is a linear function which replaces the flow variable in the system head curve. It produces an output which causes the system head curve to be related in shape to the native head curve but can be moved around to suit the needs of the user. The user may be an automated system or any other suitable system. This variant of the system head curve offers several important benefits for the system head curve tracking procedure.

First, most control-oriented computers operate best when math is done with integer arithmetic. The flow response function allows scaling such that integer procedures may be kept within the range, for example, of 16 bit math operations. Many control languages offer linear systems in their firm-ware. Second, complex non-linear curve-fitting may be eliminated by allowing calibration of the interposing flow response function rather than the system head curve itself. Curve-fitting non-linear functions may require five or more points to get a high correlation fit. The math may be very involved and greatly increase the amount of computing power required for even small adjustments. Unlike desktop computers, in most industrial controllers memory is expensive. Also, most control-oriented languages are not easily programmed to do complex curve-fitting. In contrast, many control systems have firm-ware instructions specifically designed to calibrate linear analog systems. Linear functions may require only two points to do a calibration. In the present invention using the "Boost" form of the system head curve, the system head curve may be made to pass through zero so only one point is required to calibrate. Zero may be assumed to be the first point. Correlation of linear functions with one point will be 100%.

In the automated implementation of the present invention, calibration may be done by scanning the slope parameter in the flow response function until a substantially exact match to the system head curve at one point in the high flow region of the curve is located. The pressure at this flow point may be manually entered or it may be received from a transducer.

The system head curve may either be approximated using theoretical formulas based on piping configuration data, or it may be measured with pressure sensors. Usually the head curve may be obtained using computer software.

Using a fixed pressure system at the piping system inlet, pressure loss may be measured at a remote site at several flow rates. The inverse of this loss curve may be the "boost" variant of the system head curve. A curve may then be fitted to the boost data points.

The data once obtained may be entered either as a formula and computed by the control system, or it may be used in the form of a discrete function accessed by a mapping look-up table.

Once the system head curve is available (or a good approximation of it), points on the system head curve (flow vs. pressure) are entered. These points represent the system head curve within the algorithm, and the algorithm causes the pumps to follow that curve.

Generally, city engineers have models of the distribution systems which are fairly accurate. However, there is still some inaccuracy. This inaccuracy may be one of pressure instead of flow. The set point may be the expected duty point of the pump station through which the system head curve passes. To compensate for inaccuracy in overall pressure expectation, a value may be installed to offset the system head curve, positively or negatively.

The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to affect the described invention. Many of those variations and modifications will provide the same result and fall within the spirit of the claimed invention. It is the intention, therefore, to limit the invention only as indicated by the scope of the claims.

What is claimed is:

1. A process for controlling pressure within a fluid distribution system, said process comprising the steps of:

(a) quantifying a fluid discharge pressure required to maintain a predetermined fluid pressure at specific locations throughout said fluid distribution system and at various fluid flow rates;

(b) generating a system head curve by plotting various fluid discharge pressures at corresponding fluid flow rates;

(c) converting said system head curve to a set point boost curve;

(d) correcting said set point boost curve by employing a flow response parameter proportional to said flow over about 110% of an expected fluid flow range; and (e) controlling a pump output to adjust pressure within said fluid distribution system based on said set point boost curve.

2. The process of claim 1, wherein said fluid distribution system is a water municipal system.

3. The process of claim 1, wherein said fluid distribution system is a golf course water pumping station.

4. The process of claim 1, wherein said process is tuned during periods of high flow by employing a programmable logic controller to automatically generate a flow response curve matching current fluid flow conditions, thereby optimizing fluid pressure within said distribution system.

5. The process of claim 1, wherein an optimum fluid pump output is calculated based on signals received from one or more sensors located within said fluid distribution system.

6. A process for controlling pressure within a fluid distribution system, said process comprising the steps of:
   (a) determining a fluid discharge pressure to substantially maintain a desired fluid pressure at predetermined locations throughout said fluid distribution system;
   (b) determining a system head curve;
   (c) converting said system head curve to a set point boost curve;
   (d) correcting said set point boost curve by calibrating a flow response function; and
   (e) controlling a pump output to adjust pressure within said fluid distribution system based on said set point boost curve.

7. The process of claim 6, wherein said fluid distribution system is a water municipal system.

8. The process of claim 6, wherein said fluid distribution system is a golf course water pumping station.

9. The process of claim 6, wherein said process is tuned during periods of high flow by employing a computer to automatically generate a flow response curve matching current fluid flow conditions, thereby optimizing fluid pressure within said distribution system.

10. The process of claim 6, wherein an optimum fluid pump output is calculated based on signals received from one or more sensors located within said fluid distribution system.

* * * * *